United States Patent
Huang et al.

(10) Patent No.: US 11,657,485 B2
(45) Date of Patent: May 23, 2023

(54) METHOD FOR EXPANDING IMAGE DEPTH AND ELECTRONIC DEVICE

(71) Applicant: Mobile Drive Technology Co., Ltd., New Taipei (TW)

(72) Inventors: Yu-Kai Huang, New Taipei (TW); Winston H. Hsu, New Taipei (TW); Yueh-Cheng Liu, New Taipei (TW); Tsung-Han Wu, New Taipei (TW); Tzu-Kuei Huang, New Taipei (TW); Chun-Hsiang Huang, New Taipei (TW)

(73) Assignee: Mobile Drive Netherlands B.V., Amsterdam (NL)

( * ) Notice: Subject to any disclaimer, the term of this patent is extended or adjusted under 35 U.S.C. 154(b) by 288 days.

(21) Appl. No.: 17/226,408

(22) Filed: Apr. 9, 2021

(65) Prior Publication Data

US 2021/0319576 A1    Oct. 14, 2021

Related U.S. Application Data

(60) Provisional application No. 63/007,929, filed on Apr. 9, 2020.

(51) Int. Cl.
*G06T 5/50* (2006.01)
*G06T 7/55* (2017.01)
*G06T 7/00* (2017.01)
*G06V 10/143* (2022.01)
(Continued)

(52) U.S. Cl.
CPC .................. *G06T 5/50* (2013.01); *G06T 7/55* (2017.01); *G06T 7/97* (2017.01); *G06V 10/143* (2022.01); *G06V 10/22* (2022.01); *G06V 10/764* (2022.01)

(58) Field of Classification Search
None
See application file for complete search history.

(56) References Cited

U.S. PATENT DOCUMENTS 10,237,535 B2 * 3/2019 Warzelhan ............. H04N 23/60
11,348,269 B1 * 5/2022 Ebrahimi Afrouzi ..... G06T 7/55
(Continued)

FOREIGN PATENT DOCUMENTS

CN    103916654    7/2014
CN    109087349    12/2018

OTHER PUBLICATIONS

Zhao et al., "Deep Reconstruction of Least Significant Bits for Bit-Depth Expansion," IEEE Transactions on Image Processing, vol. 28, No. 6, Jun. 2019 (Year: 2019).*

*Primary Examiner* — Soo Shin
(74) *Attorney, Agent, or Firm* — ScienBiziP, P.C.

(57) ABSTRACT

An electronic device used in a method for expanding image depth obtains first images by a first sensor, the first images comprising depth information. The electronic device obtains second images by a second sensor, the second images comprising gradient information, and the first images correspond to the second images. The electronic device determines the pixels in the first images which contain expandable content according to the gradient information of the second images, applies expansion accordingly to the pixels in the first images to generate third images, and generate target depth maps according to the gradient information of the second images and the depth information of the third images.

20 Claims, 7 Drawing Sheets

(51) Int. Cl.
 *G06V 10/22* (2022.01)
 *G06V 10/764* (2022.01)

(56) References Cited

U.S. PATENT DOCUMENTS

2011/0164109 A1* 7/2011 Baldridge ............ H04N 13/266
 348/43
2021/0089040 A1* 3/2021 Ebrahimi Afrouzi ........................
 G05D 1/0248

* cited by examiner

FIG.4A        FIG.4B        FIG.4C

METHOD FOR EXPANDING IMAGE DEPTH AND ELECTRONIC DEVICE

CROSS-REFERENCE TO RELATED APPLICATIONS

This application claims priority to U.S. Provisional Application No. 63/007,929 filed on Apr. 9, 2020, the contents of which are incorporated by reference herein.

FIELD

The subject matter herein generally relates to field of image processing, especially to a method for expanding image depth and an electronic device.

BACKGROUND

Many types of sensors used to measure image depth, such as LiDAR sensors, stereo camera sensors, and TOF cameras. However, depth information of the images obtained by the above sensors is often too sparse. Besides, distance limits the depth information of the image obtained by the above sensors. For example, the depth information of objects in the images will be insufficient when the objects are too close or too far away in the images. In the prior art, the depth information of the image is estimated by stereo matching estimation method, which estimates the depth information based on the visual difference of images obtained by dual cameras. However, the depth information estimated by the stereo matching estimation method is related to the entire scene in the images. When an object of the scene in the image is too stark or the colors of the scene are not various, the depth information estimated by the stereo matching estimation method is erroneous.

BRIEF DESCRIPTION OF THE DRAWINGS

Implementations of the present disclosure will now be described, by way of example only, with reference to the attached figures.

FIG. 4A-FIG. 4C are schematic diagrams of determining target pixels in the second images.

DETAILED DESCRIPTION

Figure 1:
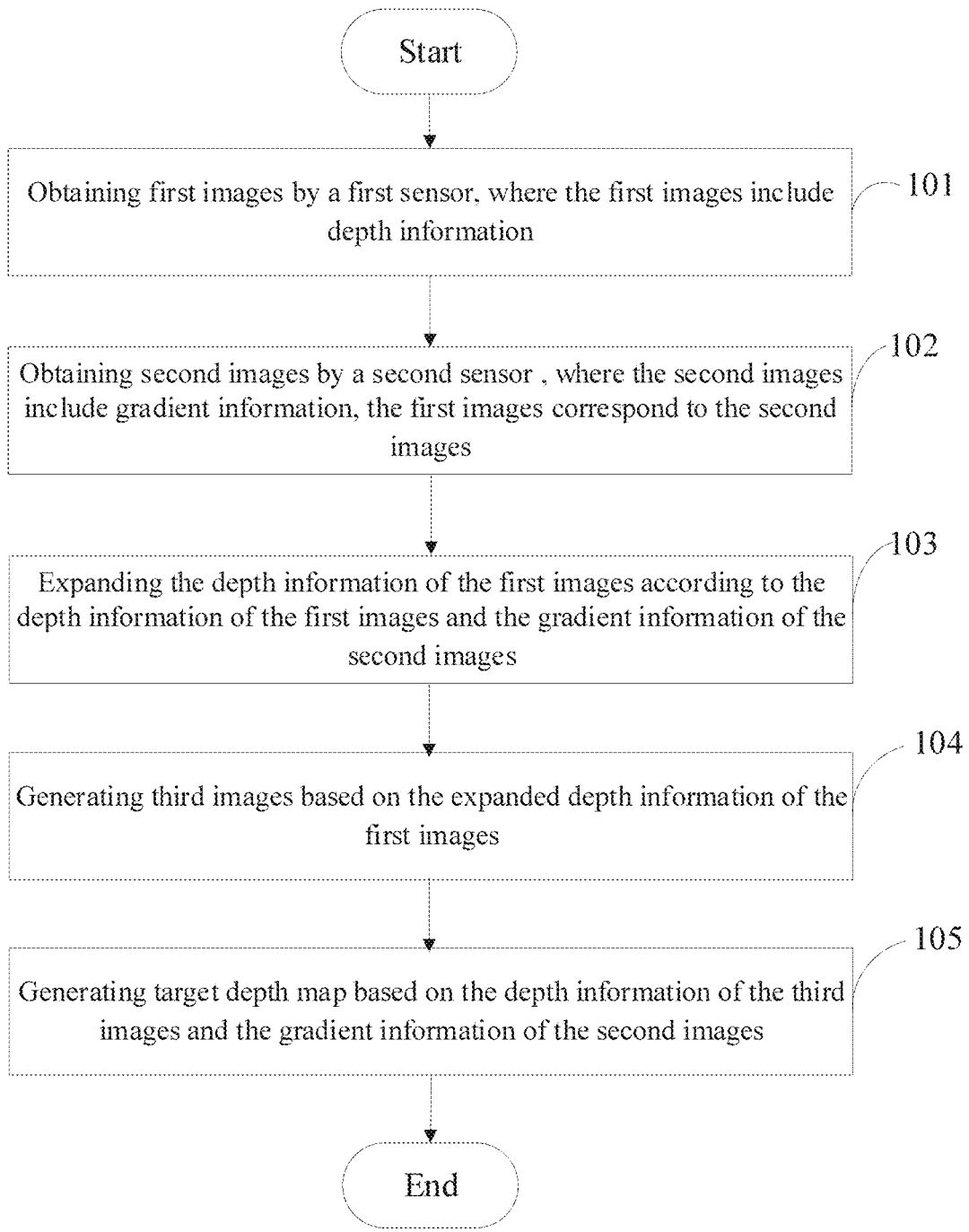
FIG. 1 is a flowchart of one embodiment of a method for expanding image depth.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a method for expanding image depth. The method is provided by way of example, as there are a variety of ways to carry out the method. The method described below can be carried out by an electronic device 6 using the configurations illustrated in FIG. 6, for example, and various elements of these figures are referenced in explaining the example method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, obtaining first images 11 by a first sensor 64 (refer to FIG. 6), where the first images 11 include depth information.

Figure 2A:
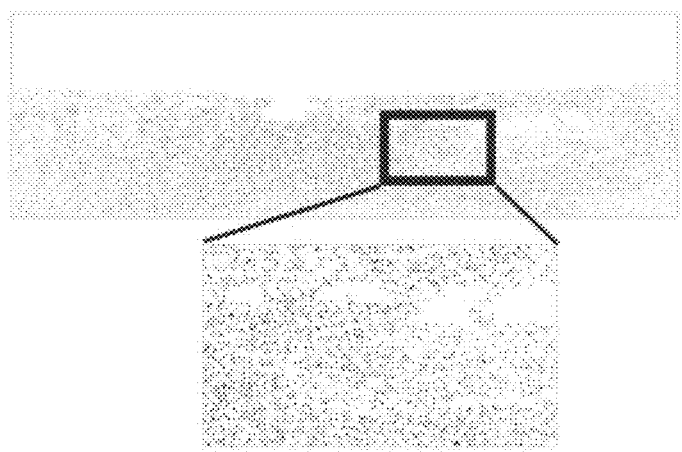
FIG. 2A is a schematic diagram of a first image in the method of FIG. 1.

In one embodiment, the first sensor 64 can be a LiDAR sensor or a millimeter wave radar sensor. The pixels of each first image obtained by the first sensor 64 include depth information. FIG. 2A illustrates one of the first images 11. The pixels in the first images 11 are distributed in point clouds.

At block 102, obtaining second images 12 by a second sensor 65 (refer to FIG. 6), where the second images 12 include gradient information, the first images 11 correspond to the second images 12.

Figure 2B:
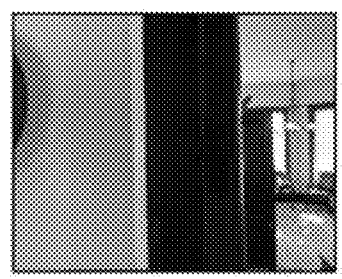
FIG. 2B is a schematic diagram of a second image in the method of FIG. 1.

In one embodiment, the second sensor 65 can be a camera. In one embodiment, each pixel of each second image includes the gradient information. FIG. 2B illustrates one of the second images 12. In one embodiment, the second images 12 can be RGB color images or gray scale images. In one embodiment, the gradient information of the RGB color images is RGB color information, and the gradient information of the gray scale images is grayscale information. In one embodiment, each of the first and second images 12 are images taken of one object. For example, the first image and the second image are of the same object and are obtained from the same or a similar angle. In one embodiment, the first sensor 64 captures the first images 11 of an object, and the second sensor 65 captures the second images 12 of the object at the same or similar angle. In one embodiment, the pixels of the first images 11 corresponds to the pixels of the second images 12.

At block 103, expanding the depth information of the first images 11 according to the depth information of the first images 11 and the gradient information of the second images 12.

In one embodiment, the electronic device selects the pixels in the preset area in the second images 12, determines a pixel of a center point of the preset area, calculates a number of gradient differences between the gradient values of the gradient information of the pixels in the preset area and the gradient value of the gradient information of the pixel of the center point, determines the target pixels from the pixels of the second images 12 according to the gradient differences and the gradient differences of the target pixels are in a preset range, takes the pixels of the first images 11 corresponding to the target pixels of the second images 12 as the image contents of the depth information to be expanded in the first images 11; and expands the depth information of the image contents of the depth information to be expanded in the first images 11.

In one embodiment, the electronic device determines the preset area in the second images 12 according to the depth information of the first images 11. In one embodiment, the depth values of the pixels of the first images 11 corresponding to the preset area of the second images 12 are in a threshold range.

Figure 3:
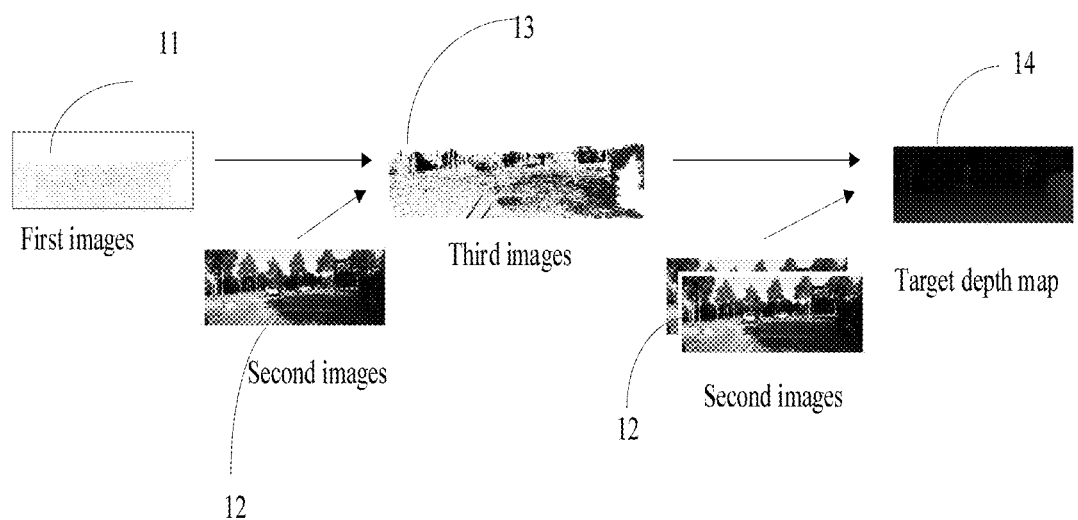
FIG. 3 is a schematic diagram of expanding depth information of the first images.

FIG. 3 illustrates expanding depth information of the first images 11. In one embodiment, the electronic device determines the depth information of the image contents to be expanded in the first images 11, and expands target depth information on the pixels with missing depth information of the image contents of the first images 11, and the target depth information is identical with the depth information of the image contents to be expanded.

In one embodiment, the electronic device expands the depth information of the first images 11 according to the depth information of the first images 11 and the RGB color information of the second images 12. Referring to FIG. 4A, the electronic device selects a 5×5 matrix pixel block as a first preset area in the second images 12, and determines the pixel of the center point of the matrix pixel block. Referring to FIG. 4B, the electronic device calculates RGB color differences between the RGB color values of the RGB color information of the pixels of the same column with the RGB color value of the RGB color information of the pixel of the center point in the matrix pixel block, and determines rows of the matrix pixel block as the target rows and the RGB color differences of the pixels of the target rows are in the first preset range. In one embodiment, the preset range may be set according to user's needs, for example, the preset range may be set to 0 to 2 RGB color value. Referring to FIG. 4C, the electronic device calculates the RGB color differences between the RGB color values of the RGB color information of the pixels of the target rows and the RGB color value of the RGB color information of the pixel of the center point, and determines the target rows from the rows of the matrix pixel block, and the RGB color differences of the target pixels are in the first preset range. The pixels of the first images 11 corresponding to the target pixels of the second images 12 as taken as the image contents of the depth information to be expanded in the first images 11. The electronic device expands the depth information of the image contents of the depth information to be expanded in the first images 11.

In one embodiment, the electronic device expands the depth information of the first images 11 according to the depth information of the first images 11 and the gradient information of the second images 12 by using a deep learning model. The deep learning model can be a Neural network based on genetic algorithm or a PSM network.

Figures 5A, 5B, 5C, 5D:
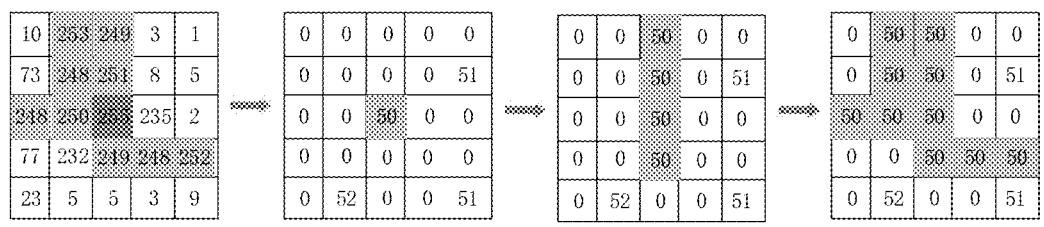
FIG. 5A-FIG. 5D are schematic diagrams of expanding the depth information of the first images according to the depth information of the first images and the gradient information of the second images.

FIG. 5A-FIG. 5D illustrate expanding the depth information of the first images 11 according to the depth information of the first images 11 and the gradient information of the second images 12. FIG. 5A is the second image, for example, FIG. 5A is a RGB image. FIG. 5B-FIG. 5D are first images 11, for example, FIG. 5B-FIG. 5D are radar images. In one embodiment, the electronic device inputs the gradient information of the second images 12 into the deep learning model, and the deep learning model process the gradient information of the second images 12 to output confidence map information of the second image. The confidence map information is used to indicate the degree of belonging to a same object or degree of having a same depth information, and the confidence map of the confidence map information is valued between 0 and 255. The greater the value of the confidence map, the greater the degree of belonging to the same object or having the same depth information in the images, the smaller the value of the confidence map, and the less the degree of belonging to the same object or having the same depth information in the images.

Referring to FIG. 5A, the electronic device selects a 5×5 matrix pixel block as a second preset area in the second images 12, and determines the pixel of the center point of the matrix pixel block; calculates confidence map between the confidence map values of the confidence map information of the pixels of the same column with the confidence map values of the confidence map information of the center point in the matrix pixel block, and determines rows of the matrix pixel block as the target rows and the confidence map differences of the pixels of the target rows are in the second preset range. In one embodiment, the second preset range may be set according to user's needs, for example, the second preset range may be set to 0 to 8 confidence map value. The electronic device calculates the confidence map differences between the confidence map values of the confidence map information of the pixels of the target rows and the confidence map value of the confidence map information of the pixel of the center point, and determines the target rows from the rows of the matrix pixel block, and the confidence map differences of the target pixels are in the second preset range. The pixels of the first images 11 corresponding to the target pixels of the second images 12 are taken as the image contents of the depth information to be expanded in the first images 11. Referring to FIG. 5b-5d, the electronic device expands the depth information of the image contents of the depth information to be expanded in the first images 11.

In one embodiment, the electronic device determines the depth information of the image contents to be expanded in the first images 11, and expands target depth information on the pixels with missing depth information of the image contents of the first images 11, and the target depth information is identical with the depth information of the image contents to be expanded. For example, Referring to FIG. 5B, the depth information of the pixel in the first images 11 corresponding to the pixel of the center point of the second preset range is 50, the electronic device expands depth information 50 on the pixels with missing depth information of the image contents of the first images 11.

In one embodiment, the depth learning model uses depth information, RGB color information, grayscale information or edge information of the pixels of the second image to process the second images 12 and output the confidence map information of the second images 12.

At block 104, generating third images based on the expanded depth information of the first images.

In one embodiment, the third images 13 are generated based on the expanded depth information of the first images 11.

At block 105, generating target depth map 14 based on the depth information of the third images and the gradient information of the second images.

In one embodiment, the electronic device inputs the depth information of the third images and the gradient information of the second images to a depth generation network, and the depth generation network trains the depth information of the third images and the gradient information of the second images to output the target depth map 14. In one embodiment, the second images are stereo images. In one embodiment, the depth generation network can be a Neural network based on genetic algorithm or a PSM network.

The preset disclosure determines image contents of the depth information to be expanded in the first images 11 captured by the first sensor 64 according to the gradient information of the second images 12 captured by the second sensor 65, and expands the image contents of the depth information to be expanded in the first images 11. Using the expanded image 13 with denser depth information, we can improve the overall density and accuracy of the target depth map 14.

Figure 6:
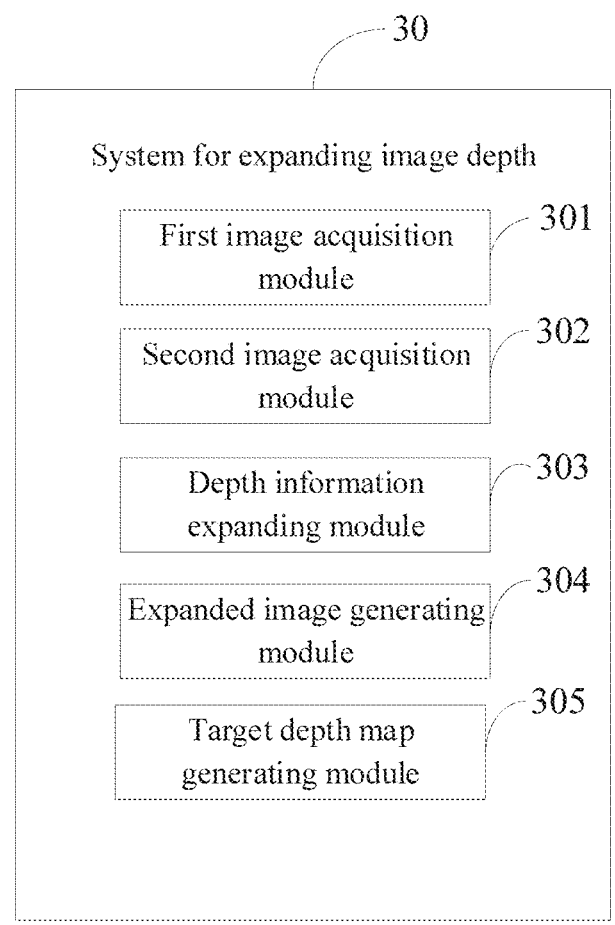
FIG. 6 is a block diagram of one embodiment of a system for expanding image depth.

FIG. 6 illustrates a system 30 for expanding image depth. In at least one exemplary embodiment, according to the different functions required, the system 30 can be divided into a plurality of functional modules. The functional modules perform the blocks 101-104 in the embodiment of FIG. 1 to perform the functions of expanding image depth. The system 30 includes, but is not limited to, a first image acquisition module 301, a second image acquisition module 302, a depth information expanding module 303, an expanded image generating module 304, and a target depth map generating module 305. The modules 301-305 of the system 30 for expanding image depth can be collections of software instructions.

The first image acquisition module 301 obtains first images 11 by the first sensor 64, where the first images 11 include depth information.

The second image acquisition module 302 obtains second images 12 by the second sensor 65, where the second images 12 include gradient information, and the first images 11 corresponds to the second images 12.

In one embodiment, each pixel of the second images 12 includes the gradient information. In one embodiment, the second images 12 can be RGB color images or gray scale images. In one embodiment, the gradient information of the RGB color images is RGB color information, and the gradient information of the gray scale images is grayscale information. In one embodiment, the first image and the second image are the images captured of the same object. For example, the first image and the second image are the images shot of the same object and at the same or similar angle. In one embodiment, the first sensor 64 captures the first images 11 of an object, and the second sensor 65 captures the second images 12 of the object at the same or similar angle. In one embodiment, the pixels of the first images 11 correspond to the pixels of the second images 12.

The depth information expanding module 303 expands the depth information of the first images 11 according to the depth information of the first images 11 and the gradient information of the second images 12.

In one embodiment, the depth information expanding module 303 selects the pixels in the preset area in the second images 12, determines a pixel of a center point of the preset area, calculates a number of gradient differences between the gradient values of the gradient information of the pixels in the preset area and the gradient value of the gradient information of the pixel of the center point, determines the target pixels from the pixels of the second images 12 according to the gradient differences and the gradient differences of the target pixels are in a preset range, takes the pixels of the first images 11 corresponding to the target pixels of the second images 12 as the image contents of the depth information to be expanded in the first images 11; and expands depth information of the image contents of the depth information to be expanded in the first images 11.

In one embodiment, the depth information expanding module 303 determines the preset area in the second images 12 according to the depth information of the first images 11. In one embodiment, the depth values of the pixels of the first images 11 corresponding to the preset area of the second images 12 are in a threshold range.

In one embodiment, the depth information expanding module 303 determines the depth information of the image contents to be expanded in the first images 11, and expands target depth information on the pixels with missing depth information of the image contents of the first images 11, and the target depth information is identical with the depth information of the image contents to be expanded.

In one embodiment, the depth information expanding module 303 expands the depth information of the first images 11 according to the depth information of the first images 11 and the RGB color information of the second images 12. Referring to FIG. 4A, the depth information expanding module 303 selects a 5×5 matrix pixel block as a first preset area in the second images 12, and determines the pixel of the center point of the matrix pixel block. Referring to FIG. 4B, the depth information expanding module 303 calculates RGB color differences between the RGB color values of the RGB color information of the pixels of the same column with the RGB color value of the RGB color information of the pixel of the center point in the matrix pixel block, and determines rows of the matrix pixel block as the target rows and the RGB color differences of the pixels of the target rows are in the first preset range. In one embodiment, the preset range may be set according to user's needs, for example, the preset range may be set to 0 to 2 RGB color value. Referring to FIG. 4C, the depth information expanding module 303 calculates the RGB color differences between the RGB color values of the RGB color information of the pixels of the target rows and the RGB color value of the RGB color information of the pixel of the center point, and determines the target rows from the rows of the matrix pixel block, and the RGB color differences of the target pixels are in the first preset range. The pixels of the first images 11 corresponding to the target pixels of the second images 12 as taken as the image contents of the depth information to be expanded in the first images 11. The depth information expanding module 303 expands the depth information of the image contents of the depth information to be expanded in the first images 11.

In one embodiment, the depth information expanding module 303 expands the depth information of the first images 11 according to the depth information of the first images 11 and the gradient information of the second images 12 by using a deep learning model. The deep learning model can be a Neural network based on genetic algorithm or a PSM network.

In one embodiment, the depth information expanding module 303 inputs the gradient information of the second images 12 into the deep learning model, and the deep learning model process the gradient information of the second images 12 to output confidence map information of the second image. The confidence map information is used to indicate the degree of belonging to a same object or degree of having a same depth information, and the confidence map of the confidence map information is valued between 0 and 255. The greater the value of the confidence map, the greater the degree of belonging to the same object or having the same depth information in the images, the smaller the value of the confidence map, and the less the degree of belonging to the same object or having the same depth information in the images.

Referring to FIG. 5A, the depth information expanding module 303 selects a 5×5 matrix pixel block as a second preset area in the second images 12, and determines the pixel of the center point of the matrix pixel block; calculates confidence map between the confidence map values of the confidence map information of the pixels of the same column with the confidence map values of the confidence map information of the center point in the matrix pixel block, and determines rows of the matrix pixel block as the target rows and the confidence map differences of the pixels of the target rows are in the second preset range. In one embodiment, the second preset range may be set according to user's needs, for example, the second preset range may be set to 0 to 8 confidence map value. The depth information expanding module 303 calculates the confidence map differences between the confidence map values of the confidence map information of the pixels of the target rows and the confidence map value of the confidence map information of the pixel of the center point, and determines the target rows from the rows of the matrix pixel block, and the confidence map differences of the target pixels are in the second preset range. The pixels of the first images 11 corresponding to the target pixels of the second images 12 are taken as the image contents of the depth information to be expanded in the first images 11. Referring to FIG. 5b-5d, the depth information expanding module 303 expands the depth information of the image contents of the depth information to be expanded in the first images 11.

In one embodiment, the depth information expanding module 303 determines the depth information of the image contents to be expanded in the first images 11, and expands target depth information on the pixels with missing depth information of the image contents of the first images 11, and the target depth information is identical with the depth information of the image contents to be expanded. For example, Referring to FIG. 5B, the depth information of the pixel in the first images 11 corresponding to the pixel of the center point of the second preset range is 50, the depth information expanding module 303 expands depth information 50 on the pixels with missing depth information of the image contents of the first images 11.

In one embodiment, the depth learning model uses depth information, RGB color information, grayscale information or edge information of the pixels of the second image to process the second images 12 and output the confidence map information of the second images 12.

The expanded image generating module 304 generates third images 13 based on the expanded the depth information of the first images 11.

In one embodiment, the third images 13 are generated based on the expanded depth information of the first images 11.

The target depth map generating module 305 generates target depth map 14 based on the depth information of the third images and the gradient information of the second images.

In one embodiment, the target depth map generating module 305 inputs the depth information of the third images and the gradient information of the second images to a depth generation network, and the depth generation network trains the depth information of the third images and the gradient information of the second images to output the target depth maps 14. In one embodiment, the second images are stereo images. In one embodiment, the depth generation network can be a Neural network based on genetic algorithm or a PSM network.

Figure 7:
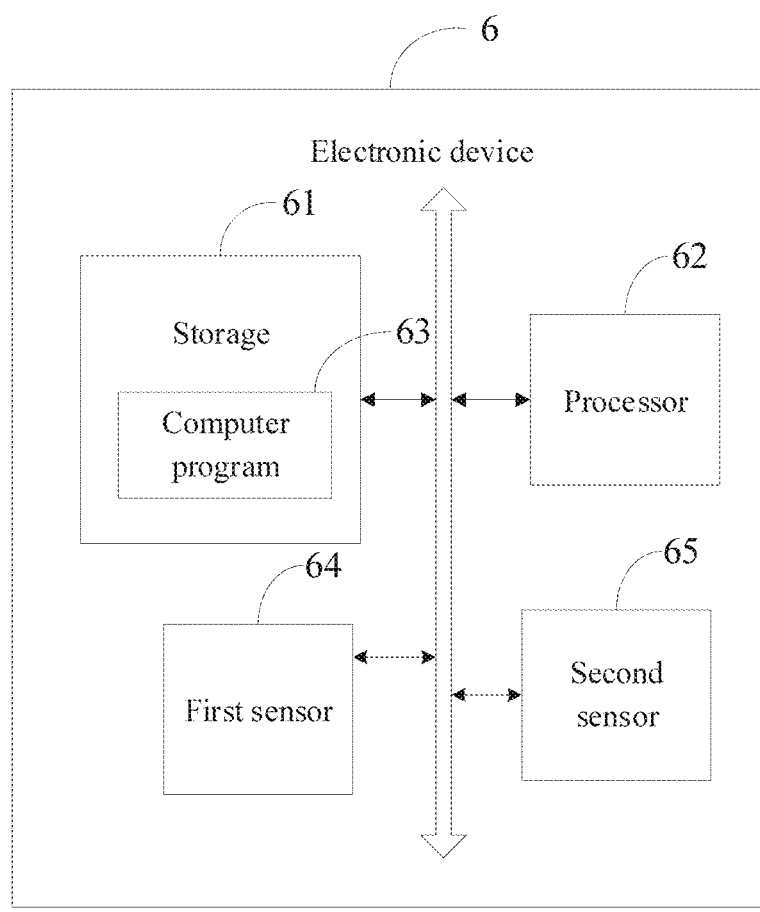
FIG. 7 is a block diagram of one embodiment of an electronic device employing the system and method.

FIG. 7 illustrates electronic device 6. The electronic device 6 includes a storage 61, a processor 62, a computer program 63, a first sensor 64, and a second sensor 65. The computer program 63 is stored in the storage 61 and executed by the processor 62. When the processor 62 executes the computer program 63, the steps in the embodiment of the method for expanding image depth are implemented, for example, blocks 101 to 105 as shown in FIG. 1. Alternatively, when the processor 62 executes the computer program 63, the functions of the modules in the embodiment of the system 30 for expanding image depth are implemented, for example, modules 301-305 shown in FIG. 6.

In one embodiment, the computer program 63 can be partitioned into one or more modules/units that are stored in the storage 61 and executed by the processor 62. The one or more modules/units may be a series of computer program instruction segments capable of performing a particular function, and the instruction segments describe the execution of the computer program 63 in the electronic device 6. For example, the computer program 63 can be divided into the first image acquisition module 301, the second image acquisition module 302, the depth information expanding module 303, the expanded image generating module 304, and the target depth map generating module 305 as shown in FIG. 6.

The electronic device 6 can be a desktop computer, a notebook, a handheld computer, a server, a cloud terminal device or other computing equipment. FIG. 6 shows only one example of the electronic device 6. There are no limitations of the electronic device 6, and other examples may include more or less components than those illustrated, or some components may be combined, or have a different arrangement. The components, such as the electronic device 6, may also include input devices, output devices, communication unit, network access devices, buses, and the like.

The processor 62 can be a central processing unit (CPU), and also include other general-purpose processors, a digital signal processor (DSP), and application specific integrated circuit (ASIC), Field-Programmable Gate Array (FPGA) or other programmable logic device, discrete gate or transistor logic device, discrete hardware components, etc. The processor 62 may be a microprocessor or the processor may be any conventional processor or the like. The processor 62 is the control center of the electronic device 6, and connects the entire electronic device 6 by using various interfaces and lines.

The storage 61 stores data and programs of the electronic device 6. For example, the storage 61 can store the system 30 for expanding image depth. In at least one exemplary embodiment, the storage 61 can include various types of non-transitory computer-readable storage mediums. For example, the storage 61 can be an internal storage system, such as a flash memory, a random access memory for temporary storage of information, and/or a read-only memory for permanent storage of information. The storage 61 can also be an external storage system, such as a hard disk, a storage card, or a data storage medium.

In one embodiment, the modules/units integrated in the electronic device 6 can be stored in a computer readable storage medium if such modules/units are independent or standalone products. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunication signals, and software distribution media.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. An electronic device comprising:
   a processor; and
   a non-transitory storage medium coupled to the processor and configured to store a plurality of instructions, which cause the processor to:
   obtain first images by a first sensor, wherein the first images comprise depth information;
   obtain second images by a second sensor, wherein the second images comprise gradient information, and the first images correspond to the second images;
   expand the depth information of the first images according to the depth information of the first images and the gradient information of the second images;
   generate third images based on the expanded depth information of the first images;
   generating target depth map based on the depth information of the third images and the gradient information of the second images.

2. The electronic device according to claim 1, wherein the plurality of instructions is further configured to cause the processor to:
   select pixels in a preset area in the second images;
   determine a pixel of a center point of the preset area;
   calculate gradient differences between the gradient values of the gradient information of the pixels in the preset area and the gradient value of the gradient information of the pixel of the center point;
   determine target pixels from the pixels of the second images according to the gradient differences and the gradient differences of the target pixels being in a preset range;
   take pixels of the first images corresponding to the target pixels of the second images as the image contents of the depth information to be expanded in the first images;
   expand the depth information of the image contents in the first images.

3. The electronic device according to claim 2, wherein the plurality of instructions is further configured to cause the processor to:
   determine the preset area in the second images according to the depth information of the first images, wherein the depth value of the pixel of the first images correspond to the preset area of the second images being in a threshold range.

4. The electronic device according to claim 2, wherein the plurality of instructions is further configured to cause the processor to:
   determine the depth information of the image contents in the first images;
   expand target depth information on the pixels with missing depth information of the image contents of the first images, wherein the target depth information is identical with the depth information of the image contents to be expanded.

5. The electronic device according to claim 1, wherein the gradient information is RGB color information or gray information.

6. The electronic device according to claim 5, wherein the plurality of instructions is further configured to cause the processor to:
   select a matrix pixel block as the preset area in the second images, and determine the pixel of the center point of the matrix pixel block;
   calculate RGB color differences between the RGB color values of the RGB color information of the pixels of the same column and the center point in the matrix pixel block, and the RGB color value of the RGB color information of the pixel of the center point;
   determine target rows from rows of the matrix pixel block, and the RGB color differences of the pixels of the target rows are in the preset range;
   calculate the RGB color differences between the RGB color values of the RGB color information of the pixels of the target rows and the RGB color value of the RGB color information of the pixel of the center point;
   determine the pixels of the target rows as the target pixels and the RGB color differences of the target pixels being in the preset range;
   take the pixels of the first images corresponding to the target pixels of the second images as the image contents of the depth information to be expanded in the first images;
   expand the depth information of the image contents in the first images.

7. The electronic device according to claim 1, wherein the first images and the second images are the images shoot on the same object and shoot at the same angle.

8. A method for expanding image depth comprising:
obtaining first images by a first sensor, wherein the first images comprise depth information;
obtaining second images by a second sensor, wherein the second images comprise gradient information, and the first images correspond to the second images;
expanding the depth information of the first images according to the depth information of the first images and the gradient information of the second images;
generating third images based on the expanded depth information of the first images;
generating target depth map based on the depth information of the third images and the gradient information of the second image.

9. The method for expanding image depth according to claim 8, further comprising:
selecting pixels in a preset area in the second images;
determining a pixel of a center point of the preset area;
calculating gradient differences between the gradient values of the gradient information of the pixels in the preset area and the gradient value of the gradient information of the pixel of the center point;
determining target pixels from the pixels of the second images according to the gradient differences and the gradient differences of the target pixels being in a preset range;
taking pixels of the first images corresponding to the target pixels of the second images as the image contents of the depth information to be expanded in the first images;
expanding the depth information of the image contents in the first images.

10. The method for expanding image depth according to claim 9, further comprising:
determining the preset area in the second images according to the depth information of the first images, and the depth value of the pixel of the first images corresponding to the preset area of the second images being in a threshold range.

11. The method for expanding image depth according to claim 9, further comprising:
determining the depth information of the image contents in the first images;
expanding target depth information on the pixels with missing depth information of the image contents of the first images, wherein the target depth information is identical with the depth information of the image contents to be expanded.

12. The method for expanding image depth according to claim 8, wherein the gradient information is RGB color information or gray information.

13. The method for expanding image depth according to claim 12, further comprising:
selecting a matrix pixel block as the preset area in the second images, and determining the pixel of the center point of the matrix pixel block;
calculating RGB color differences between the RGB color values of the RGB color information of the pixels of the same column with the center point in the matrix pixel block, and the RGB color value of the RGB color information of the pixel of the center point;
determining target rows from rows of the matrix pixel block, and the RGB color differences of the pixels of the target rows being in the preset range;
calculating the RGB color differences between the RGB color values of the RGB color information of the pixels of the target rows and the RGB color value of the RGB color information of the pixel of the center point;
determining the pixels of the target rows as the target pixels and the RGB color differences of the target pixels being in the preset range;
taking the pixels of the first images corresponding to the target pixels of the second images as the image contents of the depth information to be expanded in the first images;
expanding the depth information of the image contents in the first images.

14. The method for expanding image depth according to claim 8, wherein the first images and the second images are the images shoot on the same object and shoot at the same angle.

15. A non-transitory storage medium having stored thereon instructions that, when executed by at least one processor of an electronic device, causes the least one processor to execute instructions of a method for expanding image depth, the method for expanding image depth comprising:
obtaining first images by a first sensor, wherein the first images comprise depth information;
obtaining second images by a second sensor, wherein the second images comprise gradient information, and the first images corresponding to the second images;
expanding the depth information of the first images according to the depth information of the first images and the gradient information of the second images;
generating third images based on the expanded the depth information of first images;
generating target depth map based on the depth information of the third images and the gradient information of the second image.

16. The non-transitory storage medium according to claim 15, wherein method for expanding image depth further comprising:
selecting pixels in a preset area in the second images;
determining a pixel of a center point of the preset area;
calculating gradient differences between the gradient values of the gradient information of the pixels in the preset area and the gradient value of the gradient information of the pixel of the center point;
determining target pixels from the pixels of the second images according to the gradient differences and the gradient differences of the target pixels being in a preset range;
taking pixels of the first images corresponding to the target pixels of the second images as the image contents of the depth information to be expanded in the first images;
expanding the depth information of the image contents in the first images.

17. The non-transitory storage medium according to claim 16, wherein the method for expanding image depth further comprising:
determining the preset area in the second images according to the depth information of the first images, wherein the depth value of the pixel of the first images correspond to the preset area of the second images being in a threshold range.

18. The non-transitory storage medium according to claim 16, wherein the method for expanding image depth further comprising:
   determining the depth information of the image contents in the first images;
   expanding target depth information on the pixels with missing depth information of the image contents of the first images, wherein the target depth information is identical with the depth information of the image contents to be expanded.

19. The non-transitory storage medium according to claim 16, wherein the gradient information is RGB color information or gray information.

20. The non-transitory storage medium according to claim 19, wherein method for expanding image depth comprising:
   selecting a matrix pixel block as the preset area in the second images, and determining the pixel of the center point of the matrix pixel block;
   calculating RGB color differences between the RGB color values of the RGB color information of the pixels of the same column with the center point in the matrix pixel block, and the RGB color value of the RGB color information of the pixel of the center point;
   determining target rows from rows of the matrix pixel block, and the RGB color differences of the pixels of the target rows being in the preset range;
   calculating the RGB color differences between the RGB color values of the RGB color information of the pixels of the target rows and the RGB color value of the RGB color information of the pixel of the center point;
   determining the pixels of the target rows as the target pixels and the RGB color differences of the target pixels being in the preset range;
   taking the pixels of the first images corresponding to the target pixels of the second images as the image contents of the depth information to be expanded in the first images;
   expanding the depth information of the image contents in the first images.

* * * * *